US008100456B2

(12) United States Patent
Townson et al.

(10) Patent No.: US 8,100,456 B2
(45) Date of Patent: Jan. 24, 2012

(54) VEHICLE ENDGATE HINGE ASSEMBLY

(75) Inventors: James M. Townson, Clarkston, MI (US); Eduardo S. Atar, Rochester Hills, MI (US); Edward L. Schulte, White Lake, MI (US); Graham S. Foulkes, Washington Township, MI (US); Gary W. Krajenke, Warren, MI (US); Carl B. Corman, Famington Hills, MI (US); Anthony J. Radman, Macomb Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 611 days.

(21) Appl. No.: 12/016,226

(22) Filed: Jan. 18, 2008

(65) Prior Publication Data

US 2009/0184533 A1 Jul. 23, 2009

(51) Int. Cl.
*B62D 33/03* (2006.01)

(52) U.S. Cl. ...................................................... 296/57.1

(58) Field of Classification Search .................... 296/50, 296/57.1, 59, 60, 51; 16/286, 277

See application file for complete search history.

(56) References Cited

U.S. PATENT DOCUMENTS

| | | | | |
|---|---|---|---|---|
| 3,387,406 | A * | 6/1968 | Coker et al. | 49/192 |
| 3,454,299 | A * | 7/1969 | Hewitt et al. | 296/50 |
| 5,058,238 | A * | 10/1991 | Lautenschlager | 16/278 |
| 6,773,047 | B2 | 8/2004 | Gruber | |
| 7,147,260 | B2 * | 12/2006 | Eschebach et al. | 296/57.1 |
| 2004/0032141 | A1 * | 2/2004 | Moyna | 296/50 |
| 2007/0085365 | A1 * | 4/2007 | Bibeau | 296/50 |

* cited by examiner

*Primary Examiner* — Glenn Dayoan
*Assistant Examiner* — Sunsurraye Westbrook

(57) ABSTRACT

A vehicle endgate hinge assembly is disclosed. The hinge assembly has a bodyside hinge strap including a hinge support boss extending through the endgate opening shut-face and having a central hole that is coaxial with the endgate pivot axis, a mounting plate located outboard of the shut-face, and a threaded portion extending from the mounting plate through the shut-face. The hinge assembly may have a crank including a hinge key pivotally coupled to a member mounted on the endgate, a pivot shaft extending from the hinge key through the central hole, a lever arm extending from the pivot shaft normal to the endgate pivot axis, and a ball extending from the lever arm spaced from the endgate pivot axis. A nut is located inboard of the endgate opening shut-face and threadably received on the threaded portion, and an energy storage mechanism is coupled to the ball.

20 Claims, 5 Drawing Sheets

Fig. 8
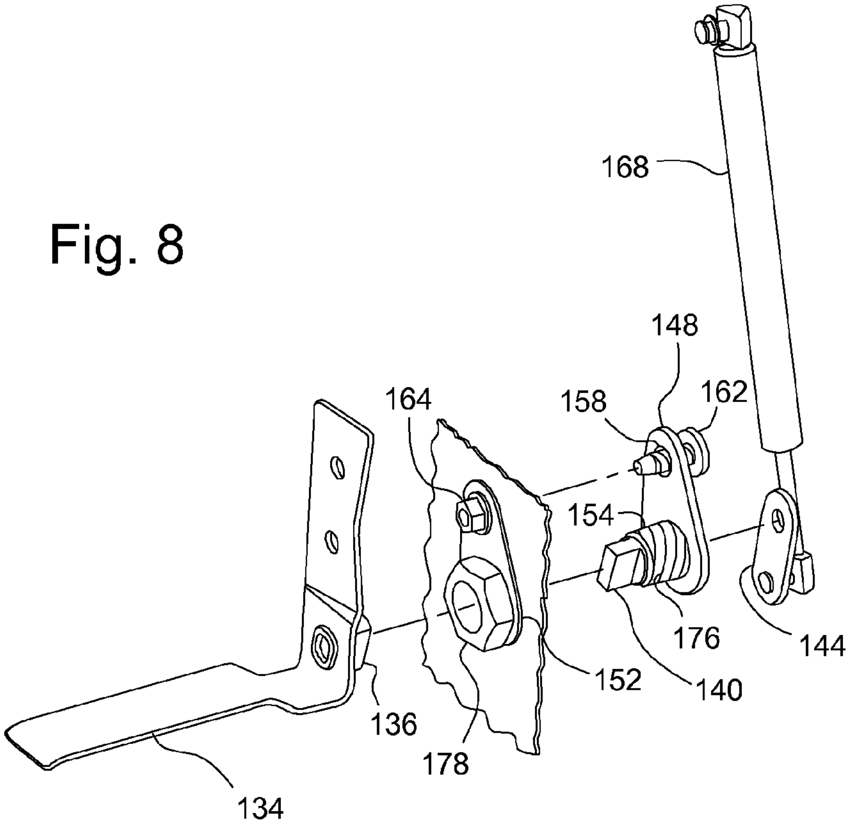
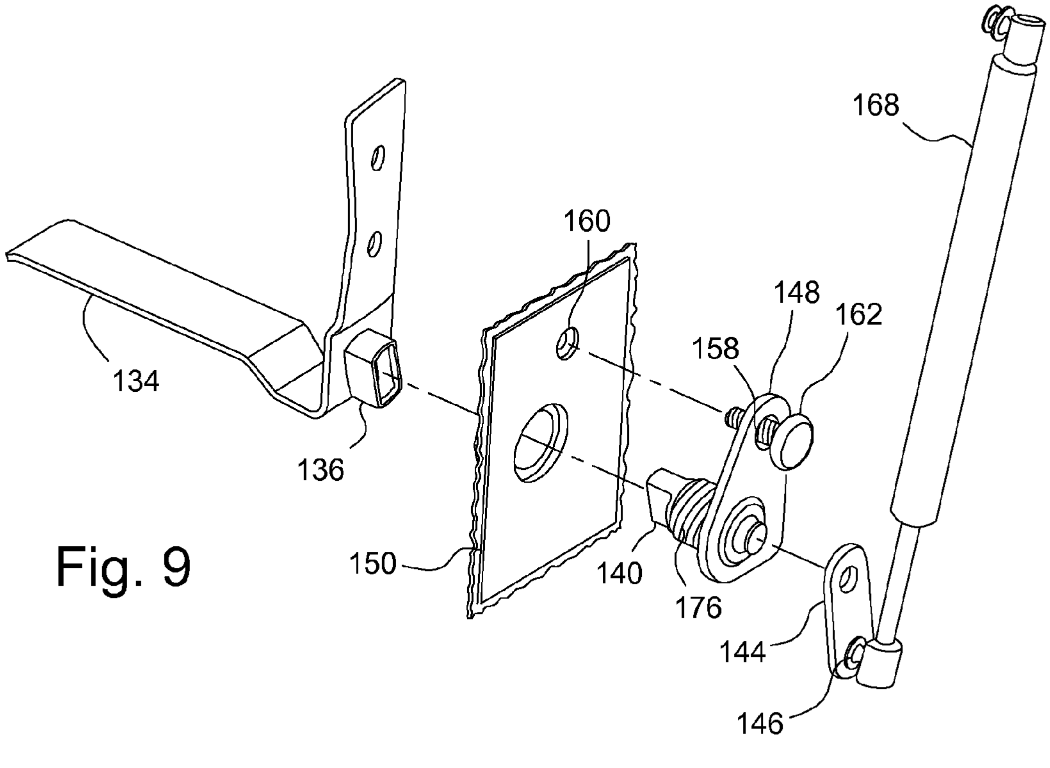
Fig. 9

VEHICLE ENDGATE HINGE ASSEMBLY

BACKGROUND OF INVENTION

The present invention relates generally to vehicle endgates and, in particular, to hinge assemblies for such vehicle endgates.

Vehicle endgates, and in particular, liftgates on pickup trucks typically do not include a mechanism for damping movement or lift assist for tailgate closing. More recently, though, some pickup trucks include lift assist to not only reduce the effort needed by one closing the tailgate, but to also add a perceived feeling of quality when opening and closing the tailgate.

A concern arises with particular lift assist mechanisms in that the additional mechanisms do not package within the rear vehicle structure without interfering with the vehicle structure or other vehicle subassemblies. Such re-design of vehicle structure or components may be more cost prohibitive than the addition of a lift assist is worth. Thus, it is desirable to provide a vehicle endgate lift assist that not only provides lift assist and damping, but also minimizes the packaging space needed for such an assembly.

SUMMARY OF INVENTION

An embodiment contemplates a vehicle endgate hinge assembly pivotally coupling an endgate to an endgate opening shut-face on a vehicle about an endgate pivot axis. The hinge assembly may comprise a bodyside hinge strap, a crank, a nut and an energy storage mechanism. The bodyside hinge strap may include a hinge support boss extending through the endgate opening shut-face and having a central hole that is coaxial with the endgate pivot axis, a mounting plate located outboard of the endgate opening shut-face, and a threaded portion extending from the mounting plate through the endgate opening shut-face. The crank may include a hinge key configured to be pivotally coupled to a member mounted on the endgate, a pivot shaft extending from the hinge key through the central hole coaxial with the endgate pivot axis, a lever arm extending from the pivot shaft approximately normal to the endgate pivot axis, and a ball extending from the lever arm spaced from the endgate pivot axis. The nut may be located inboard of the endgate opening shut-face and threadably received on the threaded portion, and the energy storage mechanism may be coupled to the ball and configured to store and release energy based on pivoting of the lever arm.

An embodiment contemplates a vehicle endgate hinge assembly pivotally coupling an endgate to an endgate opening shut-face on a vehicle about an endgate pivot axis. The hinge assembly may comprise a bodyside hinge strap including a hinge support boss extending through the endgate opening shut-face and having a central hole that is coaxial with the endgate pivot axis, a mounting plate located outboard of the endgate opening shut-face, a first fastener, spaced from hinge support boss, extending through the mounting plate and the endgate opening shut-face, and a second fastener, spaced from the first fastener and the hinge support boss, extending through the mounting plate and the endgate opening shut-face; a crank including a hinge key pivotally coupled to a member mounted on the endgate, a pivot shaft extending from the hinge key through the central hole coaxial with the endgate pivot axis, a lever arm extending from the pivot shaft approximately normal to the endgate pivot axis, and a ball extending from the lever arm spaced from the endgate pivot axis; a first nut located inboard of the endgate opening shut-face is received on the first fastener, and a second nut located inboard of the endgate opening shut-face is received on the second fastener; and an energy storage mechanism is coupled to the ball and stores and releases energy based on pivoting of the lever arm.

An embodiment contemplates a vehicle endgate hinge assembly pivotally coupling an endgate to an endgate opening shut-face on a vehicle about an endgate pivot axis. The hinge assembly may comprise a bodyside hinge strap including a hinge support boss extending through the endgate opening shut-face, having a central hole that is coaxial with the endgate pivot axis and a threaded portion on an outer surface, and a mounting plate located outboard of the endgate opening shut-face; a crank including a hinge key pivotally coupled to a member mounted on the endgate, a pivot shaft extending from the hinge key through the central hole coaxial with the endgate pivot axis, a lever arm extending from the pivot shaft approximately normal to the endgate pivot axis, and a ball extending from the lever arm spaced from the endgate pivot axis; a nut is located inboard of the endgate opening shut-face and threadably received on the threaded portion; and an energy storage mechanism is coupled to the ball and configured to store and release energy based on pivoting of the lever arm.

An advantage of an embodiment is that the hinge assembly has a minimal inboard-outboard width, thus minimizing the potential to interfere with other vehicle components, such as a lighting parabola of a tail lamp housing, while still providing for lift assist of the endgate.

BRIEF DESCRIPTION OF DRAWINGS

FIG. 8 is a view similar to FIG. 7, but showing a partially exploded hinge assembly according to the second embodiment.

FIG. 9 is a partially exploded view similar to FIG. 8, but looking forward and inboard at the second embodiment.

DETAILED DESCRIPTION

Figure 1:
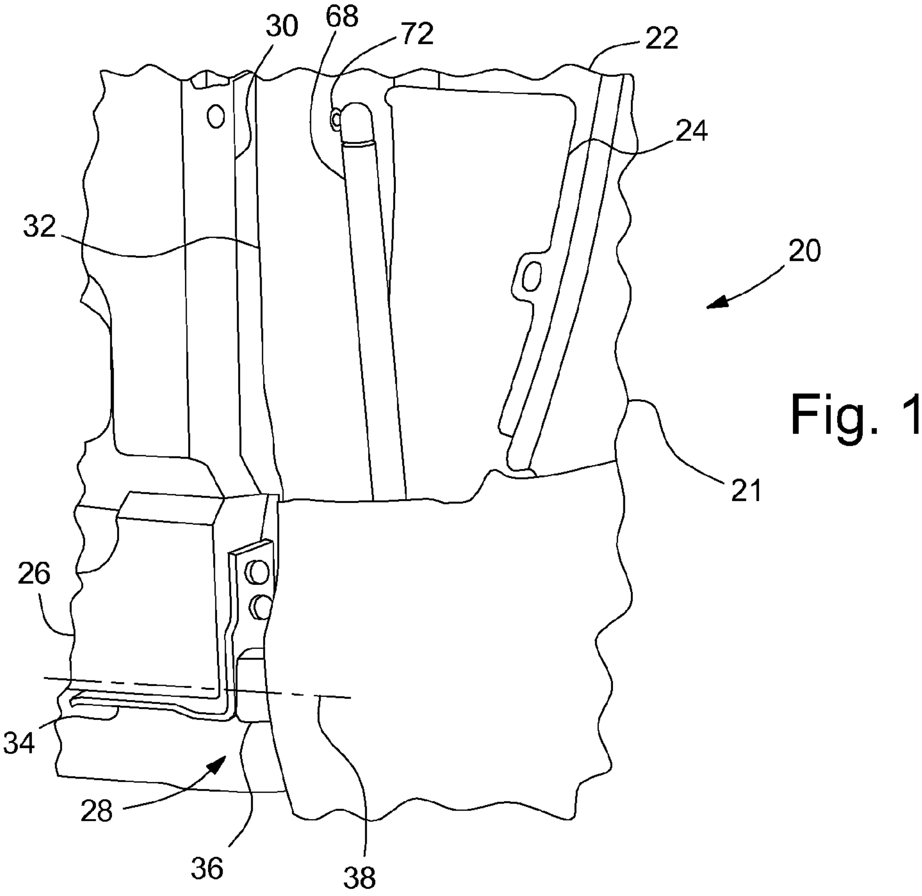
FIG. 1 is a perspective view, looking forward and inboard, of a portion of a vehicle.
Figure 2:
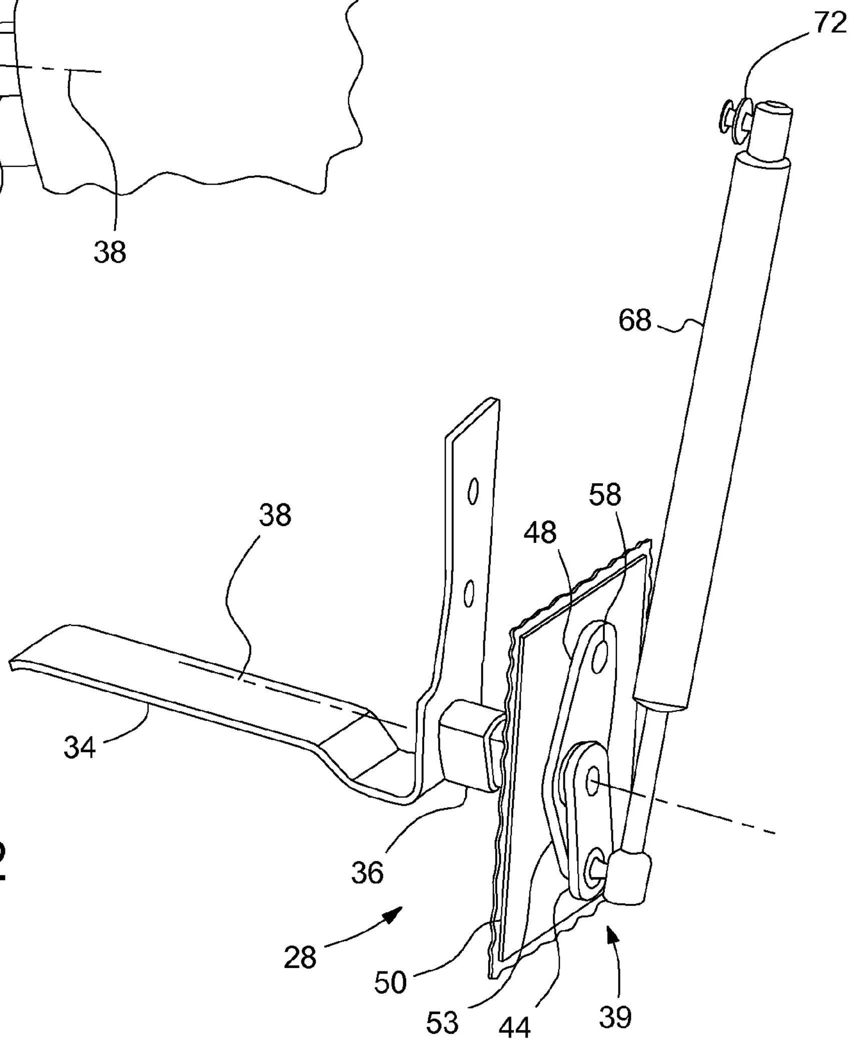
FIG. 2 is a perspective view, looking forward and inboard, of a hinge assembly, oriented in an endgate closed position.
Figure 3:
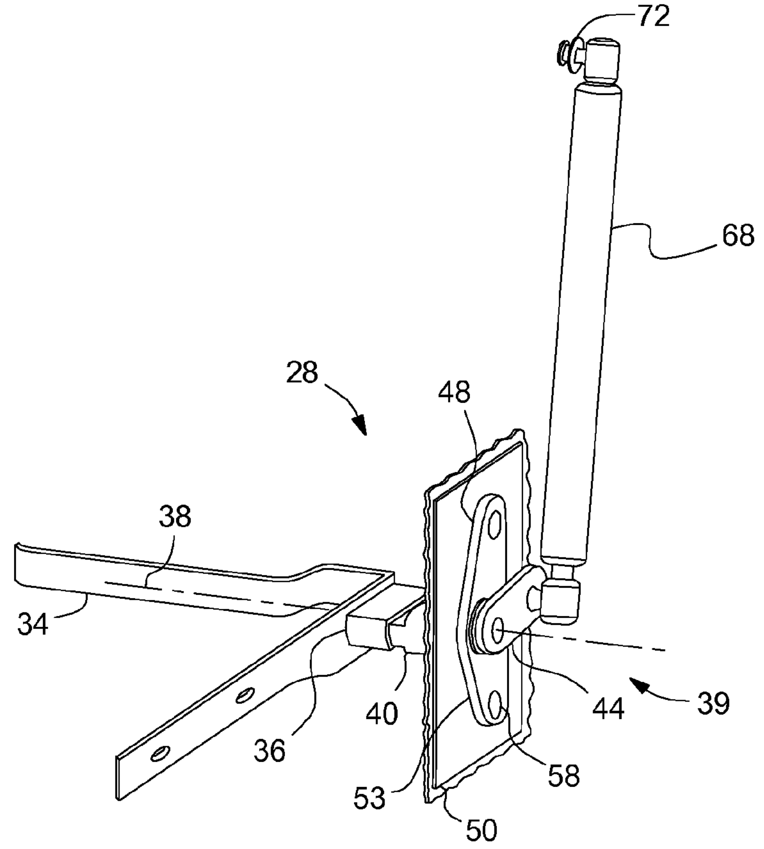
FIG. 3 is a view similar to FIG. 2, but illustrating the hinge assembly oriented in an endgate open position.
Figure 4:
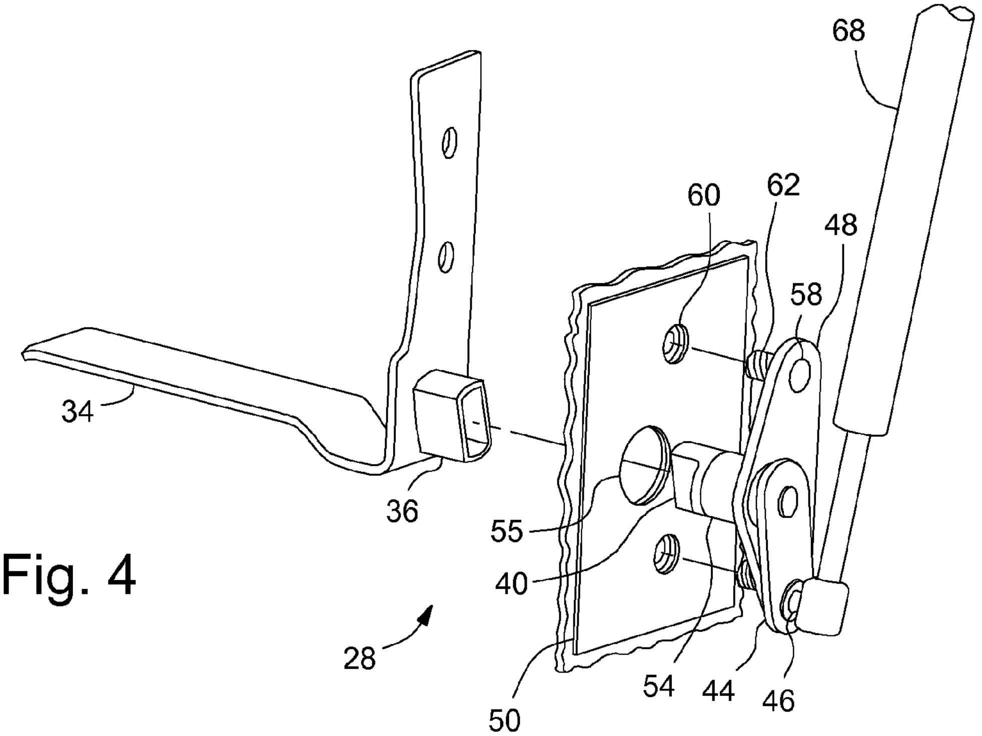
FIG. 4 is a view similar to FIG. 2, but showing a partially exploded hinge assembly.
Figure 5:
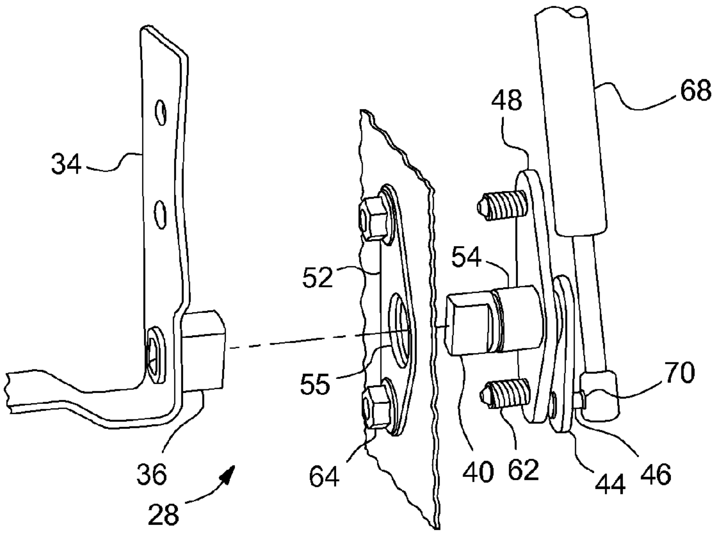
FIG. 5 is a partially exploded view similar to FIG. 4, but looking forward and outboard.
Figure 6:
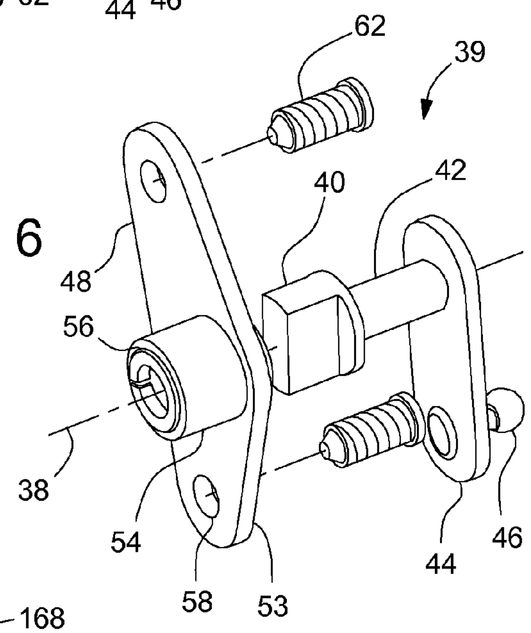
FIG. 6 is a perspective view, looking forward and outboard, of a portion of the hinge assembly of FIG. 5.

Referring to FIG. 1, a portion of a vehicle, indicated generally at 20, is shown. The vehicle 20 includes body 21 having a right, rear quarter panel 22 with a tail lamp body opening 24. An endgate 26 pivotally mounts to the body 21 via a pair of hinge assemblies 28 (only right side hinge assembly shown), into an opening 30, partially defined by endgate opening shut-faces 32 (only right side shown).

Referring now to FIGS. 1-6, the hinge assembly 28 includes an endgate mounting bracket 34 that is secured to the endgate 26. A slotted hinge cup 36 is affixed to the endgate mounting bracket 34 and centered about an endgate pivot axis 38. A hinge key 40, of a crank 39, has a shape matching the hinge cup 36 to allow the key 40 to slide in the hinge cup 36 while being rotationally coupled to it. The crank also includes a pivot shaft 42, axially centered about the pivot axis 38, extending from the key 40 and fixed to a lever arm 44. A ball 46 extends from the lever arm 44, spaced from and extending in the opposite direction from the pivot shaft 42. Accordingly, the ball 46 is eccentrically located relative to the pivot axis 38. The mounting bracket 34, hinge cup 36, hinge key 40, pivot shaft 42, lever arm 44, and ball 46 all pivot with the endgate 26.

The hinge assembly 28 also includes a bodyside hinge strap 48 that is mounted to the endgate opening shut-face 32 on its outboard side. Optionally, a support plate 50 may be mounted between the shut-face 32 and the hinge strap 48, and a hinge strap reinforcement 52 may be mounted on the inboard side of the shut-face 32. When referring to inboard and outboard herein, being inboard means that the object/surface is closer to the center of the vehicle (in the direction of the pivot axis 38) than the relative position of an object/surface that is referred to as being outboard.

The body side hinge strap 48 has a mounting plate 53 mounted outboard of the shut-face 32 and a hinge support boss 54 extending from the mounting plate 53 inboard through a hole 55 in the shut-face 32 (and support plate 50 and hinge strap reinforcement 52, if included in the assembly). The support boss 54 is coaxial with the endgate pivot axis 38 and includes bushings 56 mounted therein that supports the pivot shaft 42 and allows it to rotate more smoothly relative to the support boss 54. The bodyside hinge strap 48 also includes a pair of mounting holes 58, extending through the mounting plate 53 and spaced from the support boss 54, that align with mounting holes 60 through the shut-face 32 (and support plate 50 and hinge strap reinforcement 52, if included in the assembly). A pair of body attachment bolts 62, preferably with countersunk heads, extend inboard through the mounting holes 58, 60 and are secured with mounting nuts 64, located inboard of the shut-face 32. The body attachment bolts 62, then, not only mount the bodyside hinge strap 48 to the vehicle body 21, but also prevent it from rotating relative to the body.

A gas strut 68 includes a socket 70 at a first end that mounts to the ball 46 extending from the lever arm 44. A second, upper end of the gas strut 68 includes a strut-to-body attachment 72 that mounts to the vehicle body 21. The gas strut 68 and socket 70 can be mounted close to the lever arm 44, with the lever arm 44 located close to the bodyside hinge strap 48. This can occur because the body attachment bolts 62 extend inboard, with countersunk heads on the outboard side of the bodyside hinge strap 48 and the nuts on the inboard side of the shut-face 32. Thus, the hinge assembly 28 minimizes how far it must extend outboard relative to the endgate opening shut-face 32, minimizing potential packaging interference with certain vehicle components, such as, for example, a lens parabola (not shown) for a tail lamp housing (not shown).

The operation of the hinge assembly 28 will now be discussed. With the endgate 26 in a vertical, closed position (shown in FIG. 1), the hinge assembly 28 is oriented as shown in FIGS. 1, 2 and 4-6. Preferably, in this position, a minimal amount of energy is stored in the gas strut 68. As one begins to pivot the endgate 26 toward its fully open position (shown in FIG. 3), the pivoting of the endgate 26 causes a rotation of the slotted hinge cup 36. As the hinge cup 36 rotates, the hinge key 40, pivot shaft 42 and lever arm 44 are caused to rotate. The rotation of the lever arm 44 creates a crank action that moves the ball 46 upward and forward, which causes the socket 70 to be moved toward the strut-to-body attachment

72—storing energy in the gas strut 68. The storing of energy helps to reduce the endgate opening speed towards the end of travel in the opening direction. Then, as the endgate 26 is being closed, the stored energy in the gas strut 68 will act on the lever arm 44, and ultimately the hinge cup 36, to provide an assist torque in the direction of closing. Again, with the compact inboard-outboard hinge assembly 28, the movement of the lever arm 44 and gas strut 68 will minimize any potential interference with other vehicle components.

Figure 7:
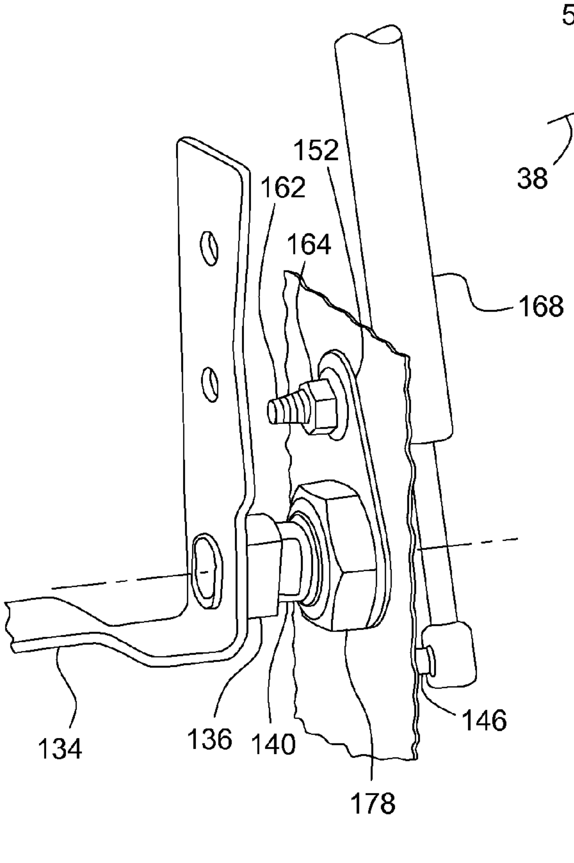
FIG. 7 is a perspective view, looking forward and outboard, of a hinge assembly according to a second embodiment.

FIGS. 7-9 illustrate a second embodiment. Since this embodiment is similar to the first, similar element numbers will be used for similar elements, but employing 100-series numbers. The gas strut 168, ball 146, lever arm 144, hinge key 140, hinge cup 136, and endgate mounting bracket 134 may be the same as in the first embodiment.

In this embodiment, though, the bodyside hinge strap 148 is modified. Only one hinge strap mounting hole 158 extends through the strap 148, thus reducing the size of the strap 148. One body attachment bolt 162 extends inboard through the mounting hole 158 and shut-face mounting hole 160 (and through a support plate 150 and hinge strap reinforcement 152, if so provided) and is secured with a mounting nut 164 located on the inboard side of the shut-face 132. This body attachment bolt 162, since it is offset from the endgate pivot axis 138, will prevent the bodyside hinge strap 148 from rotating. Also, the ball mounting location on the lever arm 144 no longer overlaps with the hinge strap 148, thus possibly allowing for an even more compact configuration than the first embodiment. To make sure that the bodyside hinge strap 148 is fully secured to the shut-face 132, the support boss 154 has threads 176 on its outer surface. The threaded support boss 154 extends inboard through the hinge hole 155 in the shut-face 132 and is secured with a support nut 178 located on the inboard side of the shut-face 132.

Figure 10:
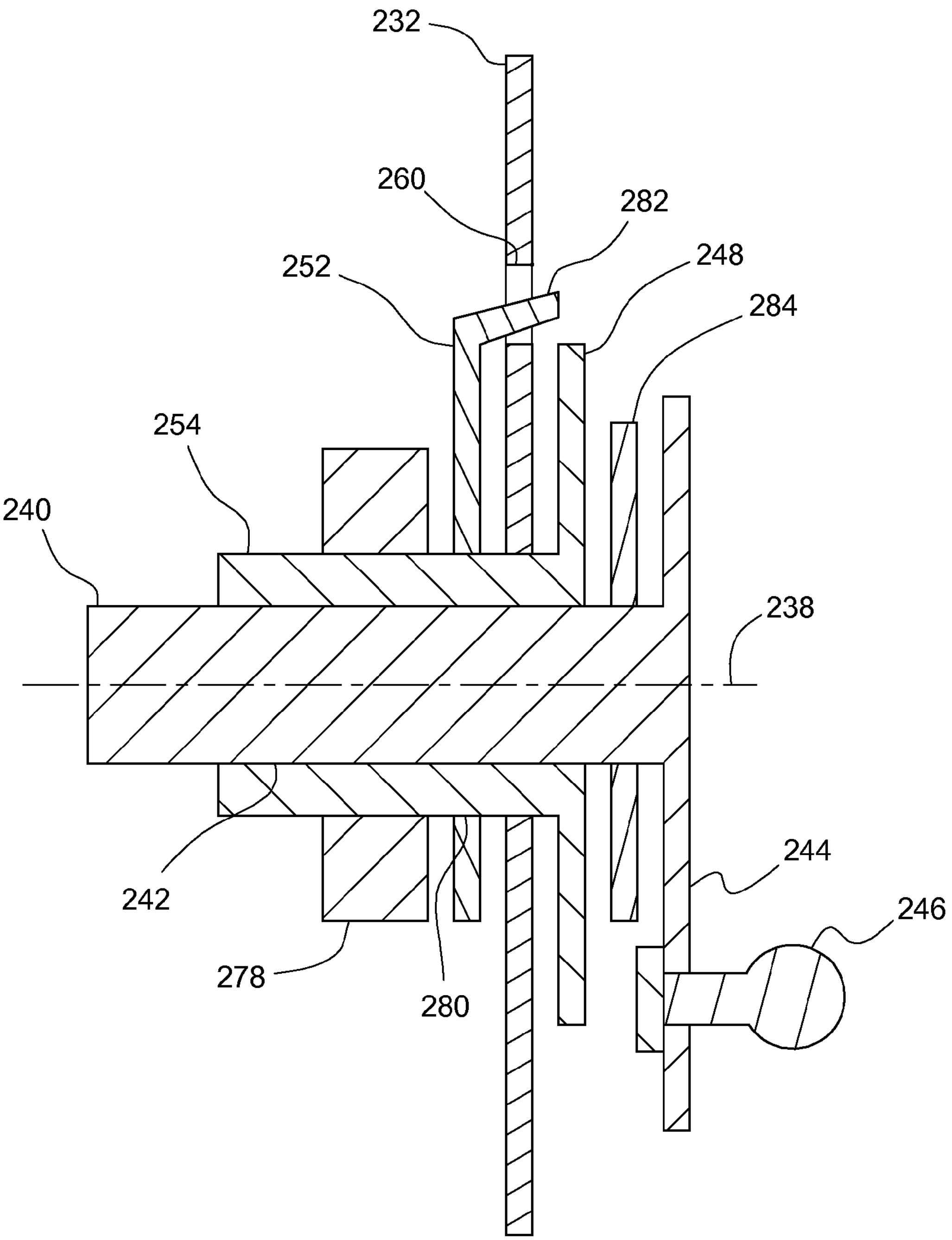
FIG. 10 is a schematic, cross section view of a portion of a hinge assembly, before being brought into its fully assembled position, according to a third embodiment.

FIG. 10 illustrates a third embodiment. Since this embodiment is similar to the second, similar element numbers will be used for similar elements, but employing 200-series numbers. The hinge key 240, pivot shaft 242, lever arm 244 and ball 246 still rotate with the endgate (not shown in this embodiment) about the endgate pivot axis 238. The hinge support boss 254 extends inboard from the bodyside hinge strap 248, through the endgate opening shut-face 232 and hinge strap reinforcement 252, and is secured with the support nut 278, which is threaded onto the hinge support boss 254.

As the support nut 278 is secured into its fully assembled position, the hinge strap reinforcement is secured between the support nut 278 and the shut-face 232. The hinge strap reinforcement 252 preferably has a hole 280 therethrough that is configured to prevent rotation between the hinge strap reinforcement 252 and the bodyside hinge strap 248. The hinge strap reinforcement 252 also includes an anti-rotation tab 282 that extends through a mounting hole 260 in the shut-face 232. Accordingly, rotation of the bodyside hinge strap 248 is prevented.

Additionally, the hinge assembly 228 may include a washer shim 284 located between the lever arm 244 and the bodyside hinge strap 248. The particular thickness of washer shim 284 employed, if any, can be used to adjust the fit of the endgate in the endgate opening in order to account for manufacturing variations. Also, bushings (not shown in this embodiment) may be employed between the hinge support boss 254 and pivot shaft 242, if so desired.

While certain embodiments of the present invention have been described in detail, those familiar with the art to which this invention relates will recognize various alternative designs and embodiments for practicing the invention as defined by the following claims.

What is claimed is:

1. A vehicle endgate hinge assembly pivotally coupling an endgate to an endgate opening shut-face on a vehicle about an endgate pivot axis, the hinge assembly comprising:

a bodyside hinge strap including a hinge support boss extending through the endgate opening shut-face and having a central hole that is coaxial with the endgate pivot axis, a mounting plate located outboard of the endgate opening shut-face, and a threaded portion extending from the mounting plate through the endgate opening shut-face;

a crank including a hinge key configured to be pivotally coupled to a member mounted on the endgate, a pivot shaft extending from the hinge key through the central hole coaxial with the endgate pivot axis, a lever arm extending from the pivot shaft approximately normal to the endgate pivot axis, and a ball extending from the lever arm spaced from the endgate pivot axis;

a nut located inboard of the endgate opening shut-face and threadably received on the threaded portion; and an energy storage mechanism coupled to the ball and configured to store and release energy based on pivoting of the lever arm.

2. The vehicle endgate hinge assembly of claim 1 wherein the threaded portion is on an outer surface of the hinge support boss.

3. The vehicle endgate hinge assembly of claim 2 wherein the bodyside hinge strap includes a threaded fastener extending through the mounting plate, spaced from the hinge support boss, and a second nut is threadably received on the threaded fastener inboard of the endgate opening shut-face.

4. The vehicle endgate hinge assembly of claim 2 including a hinge strap reinforcement rotationally fixed relative to the hinge support boss and including an anti-rotation tab, spaced from the hinge support boss, extending through the endgate opening shut-face.

5. The vehicle endgate hinge assembly of claim 1 wherein the threaded portion is on a first fastener, spaced from hinge support boss, extending through the mounting plate; and the bodyside hinge strap includes a second fastener, spaced from the first fastener and the hinge support boss, and a second nut threadably received on the second fastener inboard of shut-face.

6. The vehicle endgate hinge assembly of claim 5 wherein the first fastener and the second fastener each include heads countersunk into the mounting plate.

7. The vehicle endgate hinge assembly of claim 1 including an endgate mounting bracket configured to be secured to the endgate, and wherein the member is a hinge cup secured to the endgate mounting bracket and operatively engaging the hinge key for causing rotation of the hinge key corresponding to rotation of the endgate.

8. The vehicle endgate hinge assembly of claim 1 wherein the energy storage mechanism is a gas strut having a first end coupled to the ball and a second end configured to mount to the vehicle.

9. The vehicle endgate hinge assembly of claim 1 including a shim located on the pivot shaft between the mounting plate of the bodyside hinge strap and the lever arm.

10. The vehicle endgate hinge assembly of claim 1 including a bearing mounted in the central hole of the hinge support boss, in surface contact with the pivot shaft.

11. The vehicle endgate hinge assembly of claim 1 including a support plate mounted between the mounting plate of the bodyside hinge strap and the endgate opening shut-face.

12. The vehicle endgate hinge assembly of claim 1 including a hinge strap reinforcement located inboard of the endgate opening shut-face and having the hinge support boss extending therethrough.

13. A vehicle endgate hinge assembly pivotally coupling an endgate to an endgate opening shut-face on a vehicle about an endgate pivot axis, the hinge assembly comprising:

a bodyside hinge strap including a hinge support boss extending through the endgate opening shut-face and having a central hole that is coaxial with the endgate pivot axis, a mounting plate located outboard of the endgate opening shut-face, a first fastener, spaced from hinge support boss, configured to extend through the mounting plate and the endgate opening shut-face, and a second fastener, spaced from the first fastener and the hinge support boss, configured to extend through the mounting plate and the endgate opening shut-face;

a crank including a hinge key configured to be pivotally coupled to a member mounted on the endgate, a pivot shaft extending from the hinge key through the central hole coaxial with the endgate pivot axis, a lever arm extending from the pivot shaft approximately normal to the endgate pivot axis, and a ball extending from the lever arm spaced from the endgate pivot axis;

a first nut located inboard of the endgate opening shut-face and threadably received on the first fastener, and a second nut located inboard of the endgate opening shut-face and threadably received on the second fastener; and an energy storage mechanism coupled to the ball and configured to store and release energy based on pivoting of the lever arm.

14. The vehicle endgate hinge assembly of claim 13 wherein the first fastener and the second fastener each include heads countersunk into the mounting plate.

15. The vehicle endgate hinge assembly of claim 13 including a bearing mounted in the central hole of the hinge support boss, in surface contact with the pivot shaft.

16. The vehicle endgate hinge assembly of claim 13 including a hinge strap reinforcement located inboard of the endgate opening shut-face and having the hinge support boss extending therethrough.

17. A vehicle endgate hinge assembly pivotally coupling an endgate to an endgate opening shut-face on a vehicle about an endgate pivot axis, the hinge assembly comprising:

a bodyside hinge strap including a hinge support boss extending through the endgate opening shut-face, having a central hole that is coaxial with the endgate pivot axis and a threaded portion on an outer surface, and a mounting plate located outboard of the endgate opening shut-face;

a crank including a hinge key configured to be pivotally coupled to a member mounted on the endgate, a pivot shaft extending from the hinge key through the central hole coaxial with the endgate pivot axis, a lever arm extending from the pivot shaft approximately normal to the endgate pivot axis, and a ball extending from the lever arm spaced from the endgate pivot axis;

a nut located inboard of the endgate opening shut-face and threadably received on the threaded portion; and an energy storage mechanism coupled to the ball and configured to store and release energy based on pivoting of the lever arm.

18. The vehicle endgate hinge assembly of claim 17 wherein the bodyside hinge strap includes a threaded fastener extending through the mounting plate, spaced from the hinge support boss, and a second nut is threadably received on the threaded fastener inboard of the endgate opening shut-face.

19. The vehicle endgate hinge assembly of claim 17 including a hinge strap reinforcement rotationally fixed relative to the hinge support boss and including an anti-rotation tab, spaced from the hinge support boss, extending through the endgate opening shut-face.

20. The vehicle endgate hinge assembly of claim 17 including a shim located on the pivot shaft between the mounting plate of the bodyside hinge strap and the lever arm.

* * * * *